(12) United States Patent
Bladt et al.

(10) Patent No.: US 6,736,352 B2
(45) Date of Patent: May 18, 2004

(54) AIRCRAFT WINDOWS AND ASSOCIATED METHODS FOR INSTALLATION

(75) Inventors: Ralph Bladt, Seattle, WA (US); Joseph P. Condon, Mukilteo, WA (US); Richard Fraker, Edmonds, WA (US); Domenic S. Giuntoli, Seattle, WA (US); Paul Mikulencak, Everett, WA (US); William Quan, Newcastle, WA (US); Michael A. Ritts, Anacortes, WA (US); Ryon Christopher Warren, Seattle, WA (US)

(73) Assignee: The Boeing Company, Seattle, WA (US)

( * ) Notice: Subject to any disclaimer, the term of this patent is extended or adjusted under 35 U.S.C. 154(b) by 31 days.

(21) Appl. No.: 10/183,191

(22) Filed: Jun. 25, 2002

(65) Prior Publication Data

US 2003/0234322 A1 Dec. 25, 2003

(51) Int. Cl.⁷ ................................................ B64C 1/14
(52) U.S. Cl. .................. 244/129.3; 244/119; 244/118.5
(58) Field of Search .......................... 244/129.3, 129.1, 244/117 R, 119, 118.5; D12/317, 319, 345, 183; 296/145, 197, 201; 52/204, 65 C (56) References Cited

U.S. PATENT DOCUMENTS

| | | | | |
|---|---|---|---|---|
| 2,473,616 A | * | 6/1949 | Stephenson | 244/129.3 |
| 2,784,926 A | * | 3/1957 | Bonza et al. | 244/129.3 |
| 3,690,600 A | * | 9/1972 | Cooper | 244/121 |
| 4,053,126 A | * | 10/1977 | Duret et al. | 244/119 |
| 4,541,595 A | * | 9/1985 | Fiala et al. | 244/129.3 |
| D331,215 S | | 11/1992 | Moreno et al. | |
| 5,351,898 A | * | 10/1994 | Koehn | 244/118.5 |
| D376,343 S | | 12/1996 | Alcocer | |
| 5,816,534 A | | 10/1998 | Schumacher | |
| 5,885,714 A | * | 3/1999 | Demeester | 428/441 |
| 6,129,312 A | | 10/2000 | Weber | |
| D456,338 S | | 4/2002 | Granzeier et al. | |

OTHER PUBLICATIONS

Space Shuttle 1978, pp. 72–73, 76–77 status report for the 95 congress serial u.*
http://surf.to/comet ( 1 p.) http://www.geocites.com/Cap-Canaveral/Lab/8803/comet/pc10 _mk1 _m _gapas _5. jpg [Accessed Oct. 16, 2002].
DeHavilland Comet Homepage ( 13 pages) http://www-.geocites.com/CapeCanaveral/Lab/8803/fcometpi.htm [Accessed Oct. 16, 2002].
SE 210 Caravelle, SUD Aviation SE 210, Caravelle 10B (4 pages) http://myweb.worldnet.net/~epatte/caravelle–us.html [Accessed Feb. 26, 2002].
vi flyver (1 page) C:\WINNT\Temporary%20Internet%20Files/OLKC/Caravell.JPG [Accessed Jan. 8, 2002].
2000 –Thomas Wilberg www.1uftfahrtmuseum.com C:/WINNT/Temporary%Internet%20Files\OLKC\t6. jpeg [Accessed Jan. 8, 2002].

* cited by examiner

Primary Examiner—Galen L. Barefoot
(74) Attorney, Agent, or Firm—Perkins Coie LLP (57) ABSTRACT

Aircraft windows and associated methods for installation. The windows can be installed in a passenger cabin of an aircraft and can include a frame that supports a pane assembly having a viewing area of at least 180 square inches. The viewing area can have a triangular shape, with the sides of the window aligned with none of the major axis of the aircraft. Alternatively, the window can have a longitudinally extended rectangular shape, a diamond shape or an elliptical shape. The window frame can have a divider portion that separates two window apertures, each of which carries a separate pane assembly. Adjacent windows can be closed out with a common bezel.

47 Claims, 9 Drawing Sheets

AIRCRAFT WINDOWS AND ASSOCIATED METHODS FOR INSTALLATION

TECHNICAL FIELD

The following disclosure describes aircraft windows and methods for installing such windows in aircraft.

BACKGROUND

Windows for commercial jet aircraft typically have a generally elliptical shape with the major axis oriented vertically. One problem with windows having such a shape is that it may be difficult for passengers who are either significantly taller or significantly shorter than average to see through the window without adopting an uncomfortable seating position. One non-elliptical window is that of the Caravelle, an early commercial jet aircraft having passenger windows with a rounded triangular shape. However, the Caravelle window and other existing aircraft windows may still fail to provide suitable visibility for passengers having a wide range of statures, and fail to provide additional features described below.

SUMMARY

The present invention is directed toward aircraft windows and associated methods for installation. In one aspect of the invention, the aircraft window can include a window frame configured for installation in a passenger cabin of an aircraft. The window can further include an at least partially light transmissive pane assembly carried by the window frame. The pane assembly can have a first face and a second face facing opposite from the first face, with the pane assembly being configured to withstand a pressure differential between the first and second faces of about 8.6 psi or more. Each of the first and second faces can have a contiguous, unobstructed viewing area of about 180 square inches or more. In a further aspect of the invention, the pane assembly can include a first pane and a second pane disposed inwardly from the first pane, and the first face of the pane assembly can include an outwardly facing surface of the first pane, and the second face can include an inwardly facing surface of the first pane.

In another aspect of the invention, the window can include a window frame and an at least partially light transmissive pane assembly carried by the frame and having a generally triangular shape with first, second and third side portions, and with one of the side portions aligned with a longitudinal axis of the aircraft. Alternatively, the pane assembly can have a viewing area with a generally diamond shape. In another alternative arrangement, the pane assembly can have a viewing area with a height generally aligned with a circumferential axis of the aircraft and a width generally aligned with a longitudinal axis of the aircraft, the width being greater than the height.

In another aspect of the invention, the window frame can have a first aperture and a second aperture. An at least partially light transmissive first pane assembly can be carried by the window frame in the first aperture, and an at least partially light transmissive second pane assembly can be carried by the window frame in the second aperture. In a further aspect of the invention, the frame can include a divider between the first and second apertures, with the divider aligned with a circumferential axis, a longitudinal axis, or neither the circumferential nor longitudinal axis of the aircraft.

A method in accordance with an aspect of the invention includes providing first and second neighboring circumferentially extending ribs of an aircraft fuselage and providing a fuselage wall having a first window aperture position and a second window aperture position. The fuselage walls attach to the ribs with the first and second window aperture positions located between the first and second ribs. A window frame is attached to the fuselage wall with the window frame having a first aperture aligned with the first aperture position and a second aperture aligned with the second aperture position. An at least partially light transmissive first pane assembly is disposed in the first aperture, and an at least partially light transmissive second pane assembly is disposed in the second aperture.

DETAILED DESCRIPTION

The present disclosure describes passenger windows for jet aircraft and methods for installing such windows. Many specific details of certain embodiments of the invention are set forth in the following description and in FIGS. 1–7 to provide a thorough understanding of these embodiments. One skilled in the art, however, will understand that the present invention may have additional embodiments, and that the invention may be practiced without several of the details described below.

Figure 1:
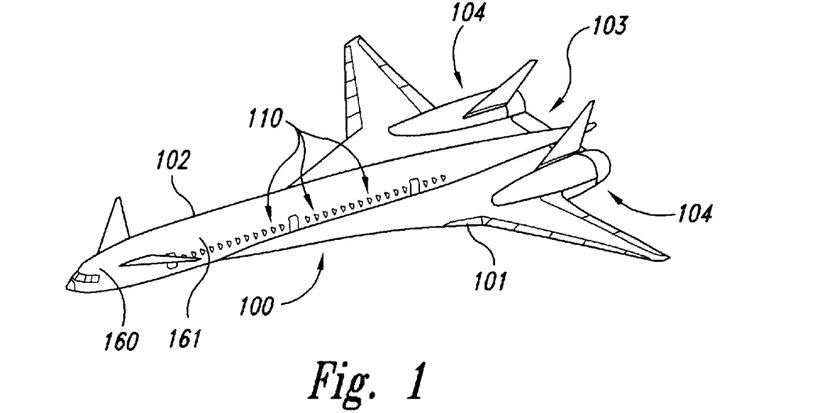
FIG. 1 is a top isometric view of an aircraft having passenger windows in accordance with an embodiment of the invention.

FIG. 1 is a top isometric view of an aircraft 100 having a fuselage 102 with window assemblies 110 in accordance with an embodiment of the invention. The fuselage 102 can include a flight deck 160 and a passenger cabin portion 161, with the window assemblies 110 installed in the passenger cabin portion 161. The aircraft 100 can have a highly swept, double delta wing 101, an aft body 103, and a pair of propulsion units 104 integrated with the aft body 103. In one aspect of this embodiment, the aircraft 100 can be configured to fly at near sonic cruise Mach numbers, for example, Mach 0.95 and above. In other embodiments, the aircraft 100 can have other configurations suitable for cruise at near-sonic Mach numbers, or the aircraft 100 can be configured to fly at supersonic cruise Mach numbers. In still further embodiments, the window assemblies 110 can be installed in an aircraft 100 having a more conventional overall arrangement, for example, a subsonic twin jet configured to fly at Mach numbers of about 0.75 and above.

Figure 2:
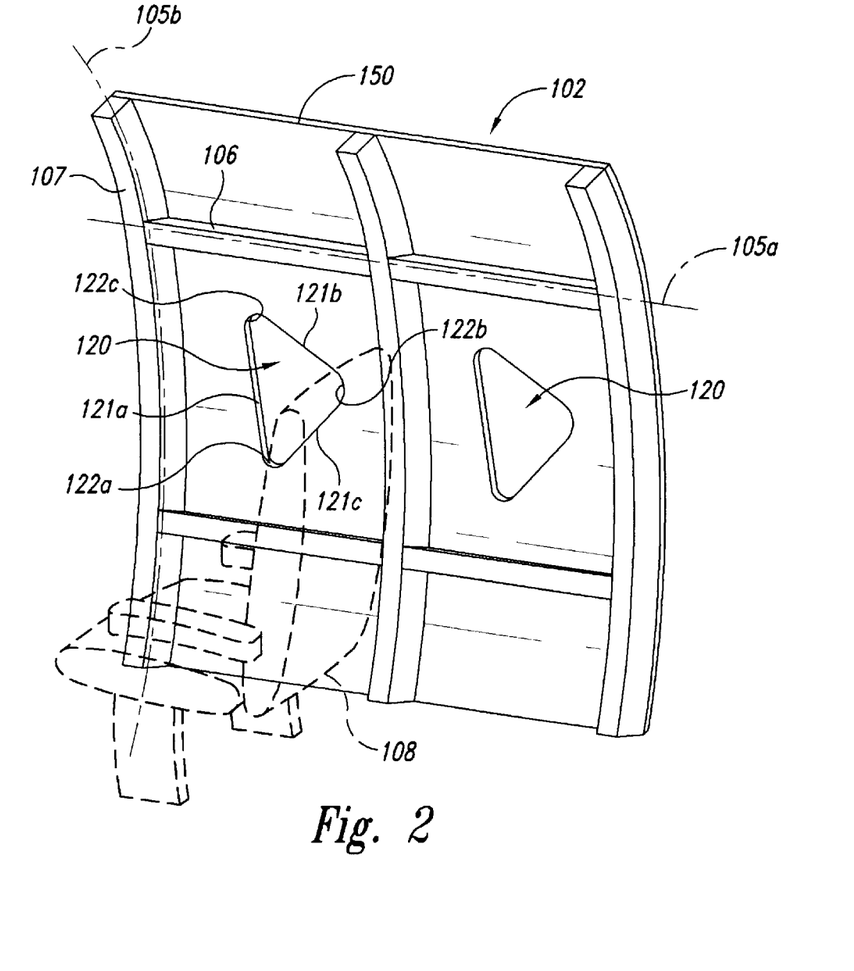
FIG. 2 is an interior isometric view of a portion of an aircraft fuselage having passenger windows in accordance with an embodiment of the invention.

FIG. 2 is an internal view of a portion of the fuselage 102 having a plurality of window openings 120, each configured to support a window assembly 110 generally similar to those shown in FIG. 1. In one aspect of this embodiment, the fuselage 102 can include an external skin 150 (such as an aluminum skin or a composite skin) supported by stringers 106 aligned with a longitudinal axis 105a and aircraft frames or ribs 107 aligned with a circumferential axis 105b. The window opening 120 can be positioned between neighboring ribs 107 and neighboring stringers 106. In one aspect of this embodiment, the window opening 120 can have a generally triangular shape and can include three sides 121 (shown as first, second and third sides 121a–c) and three corners 122 (shown as first, second and third corners 122a–c). The corners 122 can be rounded and the sides 121 can be canted so that none of the sides 122 are aligned with either the ribs 107 or the stringers 106. For example, the first side 121a (the longest side) can be canted relative to the circumferential axis 105b and the second side 121b can be inclined relative to the longitudinal axis 105a.

In one aspect of this embodiment, one window opening 120 can be provided adjacent to each seat 108 in the fuselage 102, and in other embodiments, more than one or fewer than one window opening 120 can be provided for each seat 108. In any of these embodiments, each window opening 120 can be oriented with the first corner 122a positioned beneath the other corners and the third corner 122c positioned above the other corners. Accordingly, passengers of smaller than average stature can see through one portion of the window opening 120 (for example, the lower corner 122a) and passengers of taller than average stature can see through another portion (for example, the upper corner 122c). The canted sides 121 provide a continuous, unobstructed viewing area for all passengers.

Figure 3:
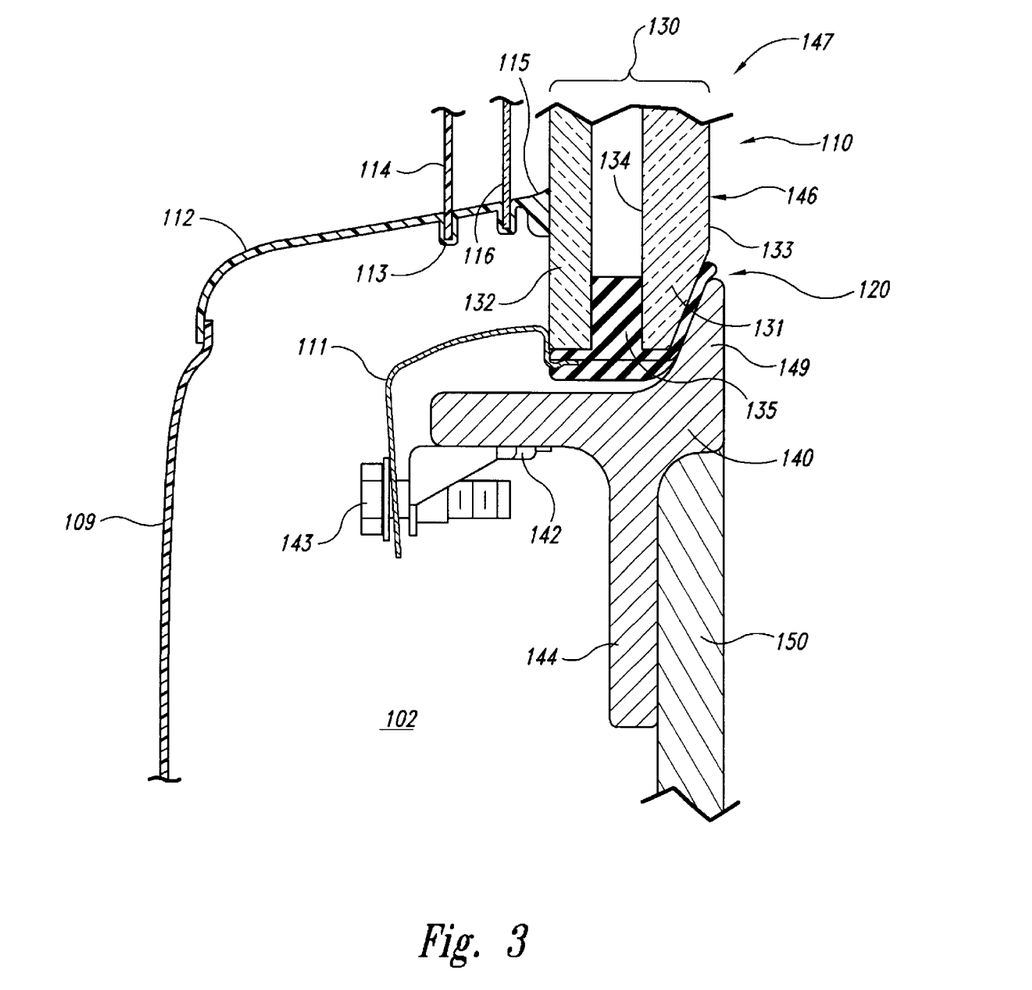
FIG. 3 is a cross-sectional view of a window installation in accordance with an embodiment of the invention.

FIG. 3 is a partially schematic, cross-sectional plan view of a window assembly 110 installed in a window opening 120 in accordance with an embodiment of the invention. In one aspect of this embodiment, the window assembly 110 can include a window frame 140 carrying a pane assembly 130. The window frame 140 and the pane assembly 130 can be positioned between the external skin 150 and an internal wall panel 109. A bezel 112 can provide a transition between the internal wall panel 109 and the pane assembly 130, as described in greater detail below.

In one aspect of an embodiment shown in FIG. 3, the window frame 140 can have an aperture 147 in which the pane assembly 130 is positioned. The window frame 140 can include an inwardly extending lip 149 that receives the pane assembly 130, and a flange 144 that extends outwardly from the aperture 147 and fits against an inner surface of the external skin 150. Fasteners (not shown in FIG. 3) or adhesive bonds can provide a secure connection between the flange 144 and the external skin 150. The window frame 140 can further include a bracket 142 that extends inwardly toward the internal wall panel 109. A spring clip 111 is fastened to the bracket 142 with a plurality of bolts 143 and biases the pane assembly 130 against the lip 149 of the window frame 140.

The pane assembly 130 can include an outer pane 131, an inner pane 132, and a pane seal 135 that seals the outer pane 131 against the lip 149 of the window frame 140. The pane seal 135 can also provide for spacing between the outer pane 131 and the inner pane 132. In a further aspect of this embodiment, the outer pane 131 can have an outwardly facing outer face 133 and an inwardly facing inner face 134. The outer pane 131 can be configured to support the pressure differential between the environment within the fuselage 102 and the environment external to the fuselage 102. For example, the outer pane 131 can be configured to withstand a pressure differential of at least 8.6 pounds per square inch (corresponding to a pressure altitude of 41,000 feet external to the fuselage 102 and a pressure altitude of 8,000 feet within the fuselage 102). With safety factors, the design pressure differential can have other, higher values, for example, 18.2 pounds per square inch. In other embodiments, the outer pane 131 can withstand other pressure differentials. For example, the aircraft 100 (FIG. 1) can be configured to fly at an altitude of 50,000 feet, and the outer pane 131 can be configured to withstand a pressure differential of about 9.25 pounds per square inch (24.25 pounds per square inch with safety factors) corresponding to a fuselage internal pressure altitude of 8,000 feet or 10.1 pounds per square inch (26.5 pounds per square inch with safety factors) corresponding to a fuselage internal pressure altitude of 6,000 feet.

In another aspect of an embodiment shown in FIG. 3, the inner pane 132 can protect the outer pane 131 from incidental contact with foreign objects inside the fuselage 102. The pressure differential between the exterior of the fuselage 102 and the interior of the fuselage 102 can be borne by the inner pane 132 alone, or by both the inner pane 132 and the outer pane 131. In still further embodiments, the pane assembly 130 can include a single pane, or more than two panes. In any of these embodiments, the pane or panes carried by the window assembly 130 are at least partially light transmissive, i.e., transparent or translucent.

The bezel 112 can provide a contoured transition between the pane assembly 130 and the window frame 140, and can hide the connection between these elements. For example, the bezel 112 can extend from the internal wall panel 109 to the inner pane 132 of the pane assembly 130. In a further aspect of this embodiment, the bezel 112 can include a bezel seal 115 that sealably engages the inner pane 132. The bezel 112 can further include an innermost, non-structural protective pane 116 to protect the inner pane 132. A shade groove 113 in the bezel 112 carries a shade 114, which is slidably positioned for selectively covering and uncovering a viewing area 146 through which passengers can see outside the aircraft 100 (FIG. 1).

In one aspect of an embodiment shown in FIG. 3, the window frame 140 can be mounted to an aluminum external skin 150. In an alternate embodiment, shown in FIGS. 4A and 4B, the window frame 140 can be mounted to a composite external skin 150 that includes composite fibers 151 disposed in a matrix material. Referring first to the partially schematic external view of FIG. 4A, the flange 144 of the window frame 140 can be positioned against an inner surface of the external skin 150, and can be fastened to the external skin 150 with fasteners 139 or adhesive bonds. In one aspect of this embodiment, the window opening 120 can be formed in the external skin 150 in a first operation, and the window frame 140 can be mounted in the window opening 120 in a subsequent, second operation. In an alternate embodiment, the window frame 140 can be attached to the external skin 150 in a first operation, and can provide a template for cutting out the window opening 120 in a subsequent, second operation. In either embodiment, the installed window assembly 110 can provide a viewing area 146 having a shape generally similar to that described above with reference to FIG. 2, or the viewing area can have other shapes, as described below with reference to FIGS. 5A–6J.

Figure 4A:
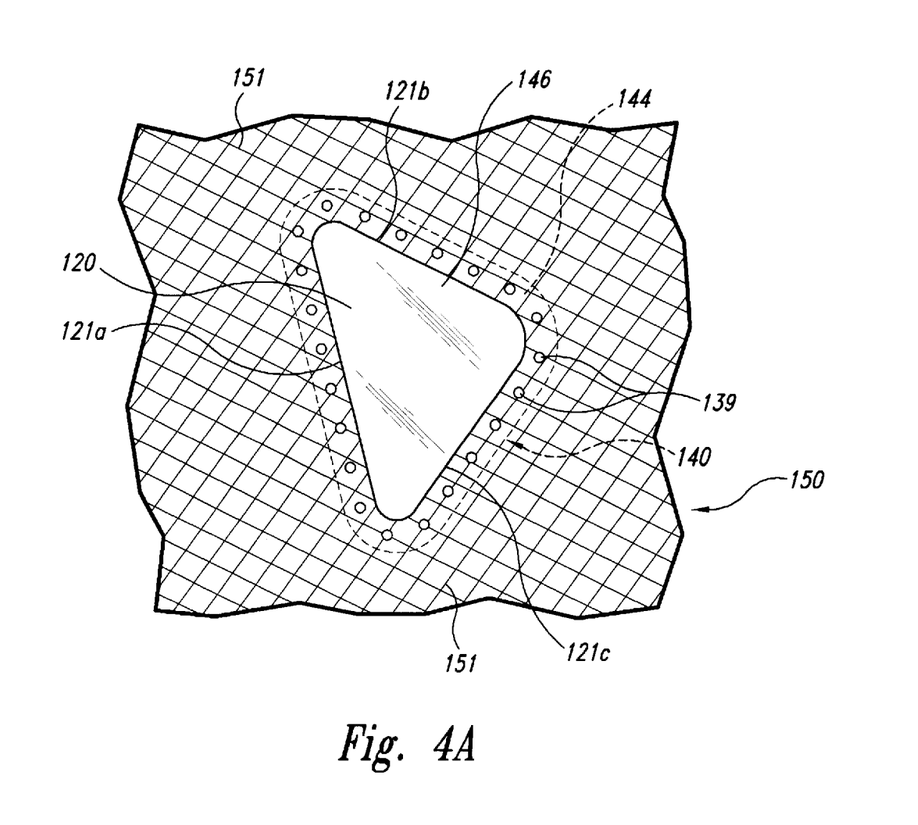
FIGS. 4A–4B illustrate window installations in accordance with other embodiments of the invention.
Figure 4B:
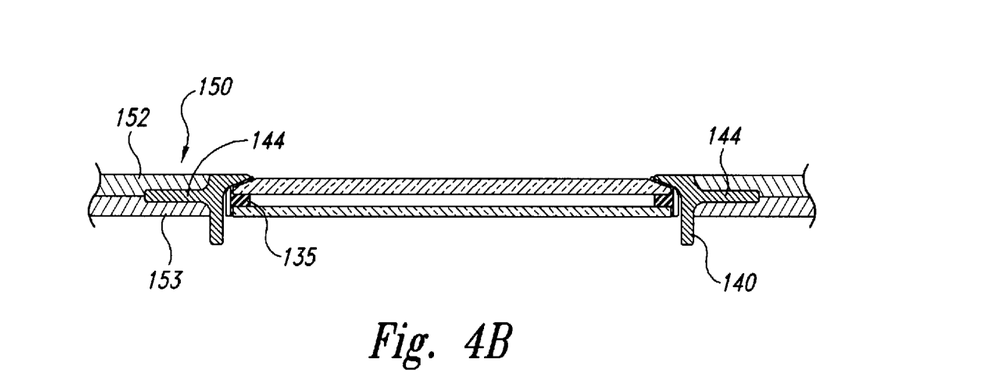

In a further aspect of an embodiment shown in FIG. 4A, one or more of the sides 121 of the opening 120 can be aligned parallel or approximately parallel with at least some of the composite fibers 151. For example, the second side 121b can be aligned parallel with composite fibers 151 running in one direction, and the third side 121c can be aligned parallel with composite fibers 151 running in a transverse direction. An advantage of this arrangement is that the number of composite fibers 151 that are severed or discontinuous (as a result of cutting the window opening 120) can be reduced by selectively orienting the opening 120 to align with the direction of at least some of the composite fibers 151.

In one aspect of an embodiment shown in FIG. 4A, the flange 144 of the window frame 140 can be positioned adjacent to the inner surface of the external skin 150. In another embodiment, shown in cross-sectional plan view in FIG. 4B, the flange 144 can be integrated with the external skin 150. For example, the external skin 150 can include an outer composite layer 152 and an inner composite layer 153 which together sandwich the flange 144. An advantage of this arrangement is that it can reduce and/or eliminate the need for fasteners 139 (FIG. 4A) which are typically used to secure the window frame 140 to the external skin 150. Conversely, an advantage of the fasteners 139 described above with reference to FIG. 4A is that they can allow the window frame 140 to be easily removed from the external skin 150, for example, for repairs or replacement.

Figures 5A, 5B, 5C, 5D:
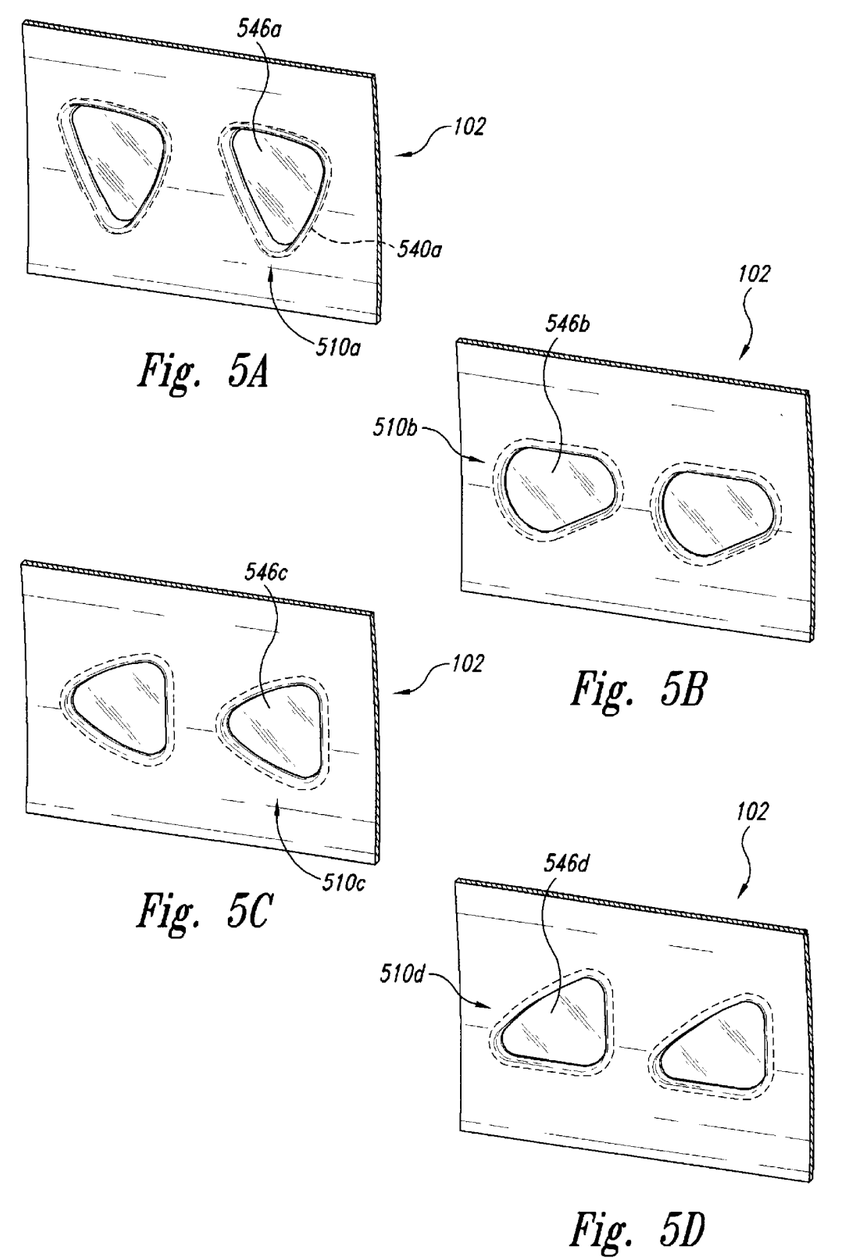
FIGS. 5A–L illustrate windows having shapes and sizes in accordance with still further embodiments of the invention.
Figures 5E, 5F, 5G, 5H:
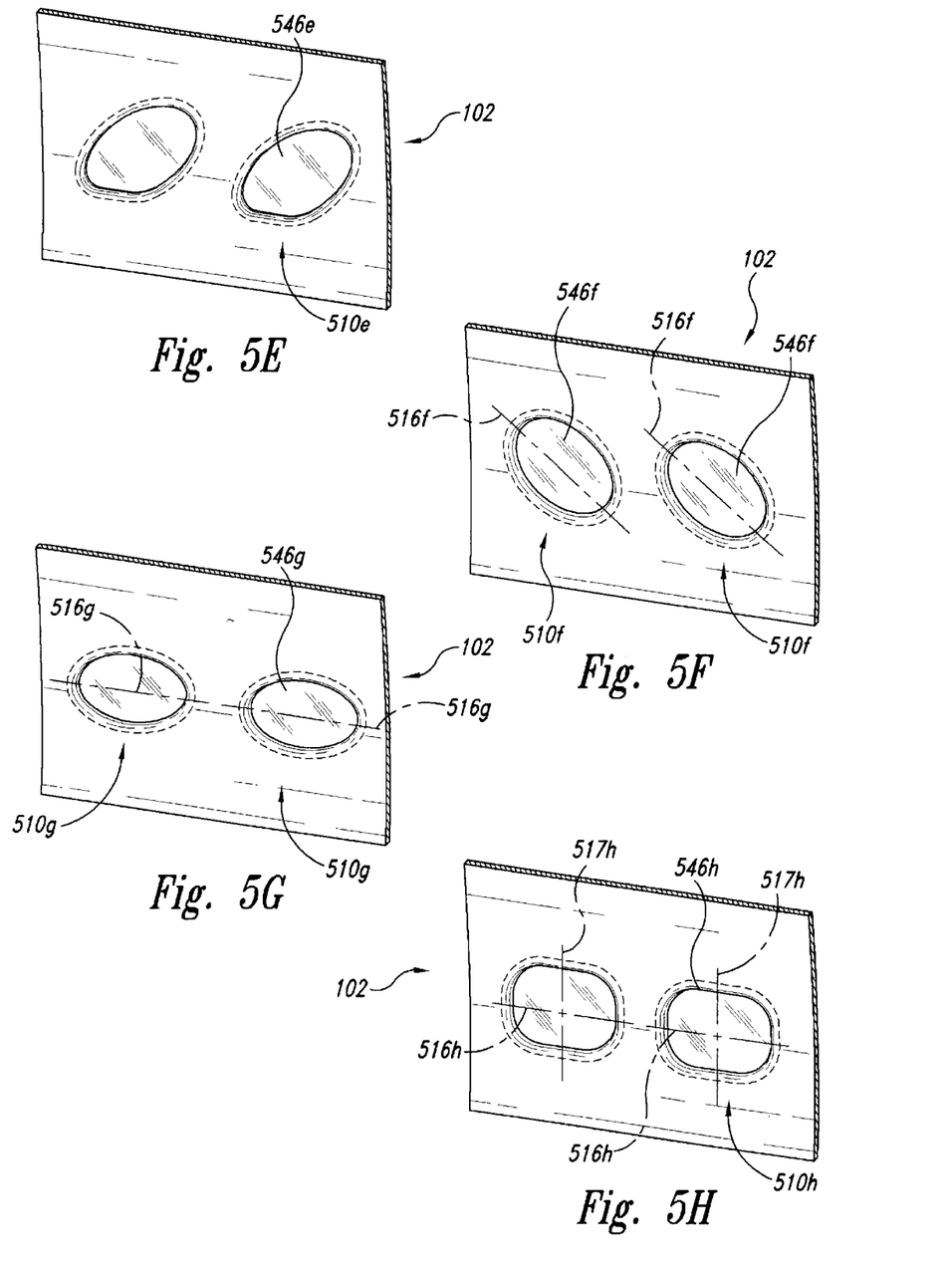

FIGS. 5A–5L illustrate window assemblies that can be installed in accordance with any of the methods described above with reference to FIGS. 2–4B, and which have shapes different than those illustrated in FIG. 2. FIG. 5A illustrates a window assembly 510*a* having a frame 540*a* that surrounds a generally triangular viewing area 546*a*. The viewing area 546*a* can be slightly smaller than the viewing area 146 shown in FIG. 4A, and one of the sides of the viewing area 546*a* can be generally horizontal to define an inverted, v-shaped area. FIG. 5B illustrates a window assembly 510*b* having a triangular/pear-shaped viewing area 546*b* in accordance with another embodiment of the invention. FIG. 5C illustrates a window assembly 510*c* having a triangular viewing area 546*c* with one side of the viewing area 546*c* oriented in a generally vertical or circumferential direction in accordance with another embodiment of the invention. FIG. 5D illustrates a window assembly 510*d* having a triangular viewing area 546*d* with one side of the viewing area oriented generally horizontally in accordance with yet another embodiment of the invention. FIG. 5E illustrates a window assembly 510*e* having a viewing area 546*e* that is generally triangular an includes vertices that are substantially rounded so that the viewing area 546*e* tends toward an elliptical shape.

FIGS. 5F–5G illustrate windows having generally elliptical shapes in accordance with further embodiments of the invention. In one embodiment shown in FIG. 5F, each window assembly 510*f* can have an elliptical viewing area 546*f*, with a major axis 516*f* of the viewing area 546*f* inclined at an acute angle relative to the horizontal. In an embodiment shown in FIG. 5G, a window assembly 510*g* can include an elliptical viewing area 546*g* with a generally horizontal major axis 516*g*.

Figure 5I:
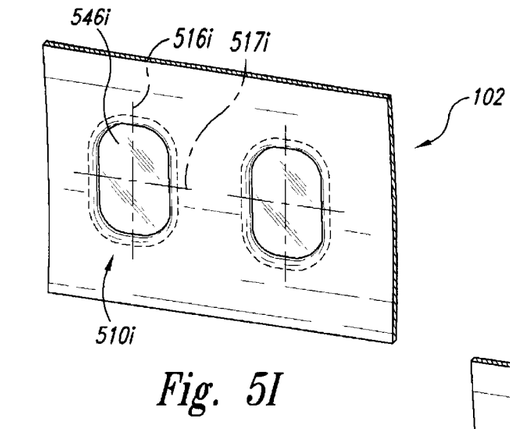

FIGS. 5H–5I illustrate windows having generally rectangular shapes. In one embodiment shown in FIG. 5H, a window assembly 510*h* can have a rectangular, horizontally oriented viewing area 546*h*. Accordingly, the viewing area 546*h* can include a major axis 516*h* generally aligned with a longitudinal axis of the fuselage 102 (FIG. 2), and a minor axis 517*h* generally aligned with a circumferential axis of the fuselage 102. An advantage of the horizontally oriented viewing area 546*h* is that it can be visually accessible from seats located behind and/or forward of one another. In another embodiment, shown in FIG. 5I, a window assembly 510*i* can have a vertically disposed rectangular viewing area 546*i*. Accordingly the viewing area 546*i* can include a major axis 516*i* aligned with a circumferential axis of the fuselage 102, and a minor axis 517*i* aligned with a longitudinal axis of the fuselage 102. An advantage of the vertically disposed viewing area 546*i* is that it can be visually accessed by passengers having widely varying heights.

Figure 5J:
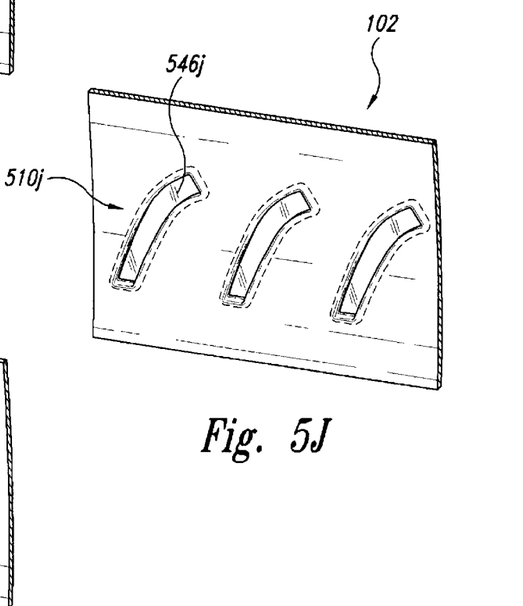
Figure 5K:
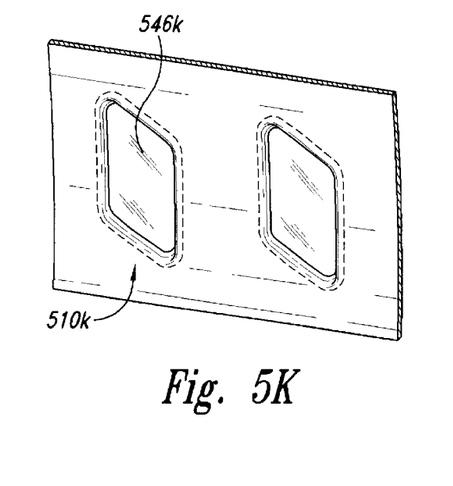
Figure 5L:
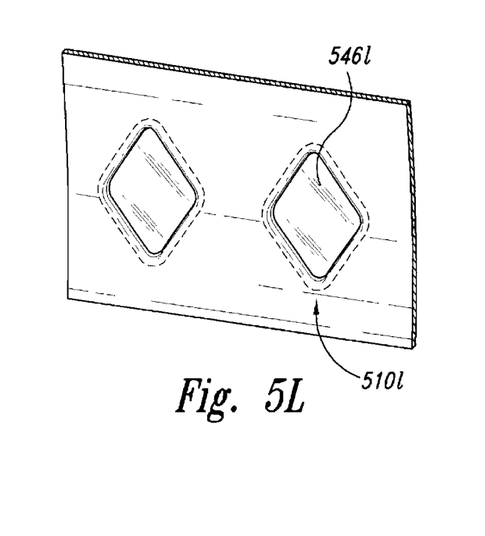

In yet further embodiments, the windows can have an arcuate shape. For example, as shown in FIG. 5J, a window assembly 510*j* can include a viewing area 546*j* having a "boomerang" or other arcuate shape. One feature of this arrangement is that it can provide viewing for passengers having a wide range of statures, without requiring a substantial window area. An advantage of this feature is that the window assembly 510*j* can have a smaller impact on the pressurization of the fuselage 102 if the window assembly 510*j* fails. In still further embodiments, the windows can have other shapes, such as a diamond shape. For example, as shown in FIG. 5K, a window assembly 510*k* can have a viewing area 546*k* with a canted diamond shape. In another embodiment, shown in FIG. 5L, a window assembly 510*l* can include a viewing area 546*l* having a generally vertically oriented diamond shape. In other embodiments, the window assembly can have other viewing areas, for example, a horizontally oriented, diamond-shaped viewing area.

In any of the foregoing embodiments described above with reference to FIGS. 1–5L, the window assemblies can have an unobstructed viewing area of about the same size as that of existing aircraft. For example, the viewing area can be about 160 square inches. In another embodiment, any of the window assemblies described above with reference to FIGS. 1–5L can have viewing areas that are substantially increased from those of existing passenger windows. For example, the viewing areas can be at least 180 square inches. In one embodiment, the window assembly 110 (described above with reference to FIGS. 2–4B) can have a viewing area 146 of about 246 square inches. In another embodiment, the window assembly 546*h* (described above with reference to FIG. 5H) can have a height of about 16 inches, a width of about 22 inches, and a viewing area 546*h* of about 320 square inches. In another embodiment, the width of the viewing area 546*h* can be at least half of the distance between adjacent ribs 107 (FIG. 2). An advantage of the increased viewing area is that passengers typically enjoy having increased visual access to the environment external to the aircraft.

Figure 6A:
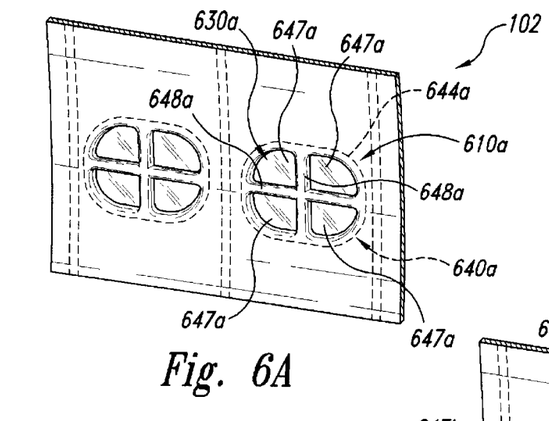
FIGS. 6A–6I illustrate windows having partitions in accordance with still further embodiments of the invention.

In other embodiments, the overall viewing area and/or the longitudinal and/or circumferential extent of the viewing area can be increased with multiple pane assemblies, as described in greater detail below with reference to FIGS. 6A–6I. Beginning with FIG. 6A, the fuselage 102 can include a window assembly 610*a* having a frame 640*a* with a flange 644*a* configured to attach to the fuselage 102 in any of the manners described above with reference to FIGS. 3–4B. The frame 640*a* can further include horizontally and vertically extending cross members or dividers 648*a* that can be integrally formed or rigidly attached to the flange 644 or other surrounding portions of the frame 640*a*. In one embodiment, the cross members 648*a* can define four apertures 647*a*. Each aperture 647*a* can support a pane assembly 630*a* having one or more panes (for example, an inner pane and an outer pane) in a manner generally similar to that described above with reference to FIG. 3. Accordingly, the overall viewing area provided by all four pane assemblies 630*a* can be substantially greater than that provided by some existing single pane assembly arrangements. An advantage of an embodiment of the multiple pane assembly arrangement shown in FIG. 6A is that one of the pane assemblies 630a can fail without causing the remaining pane assemblies 630a to fail. Accordingly, the effect of a depressurization event created by the failure of a single pane assembly 630a can be limited in extent because the remaining pane assemblies 630a can remain intact.

Figure 6B:
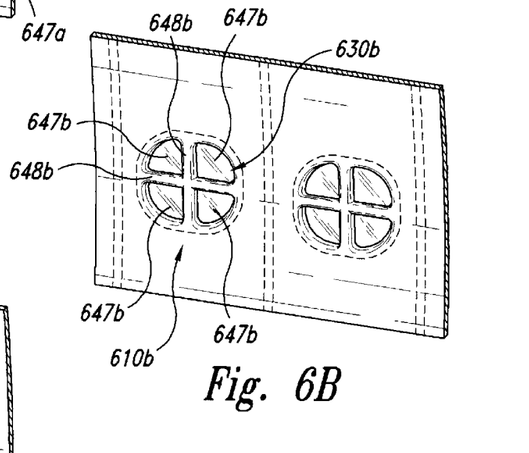
Figure 6C:
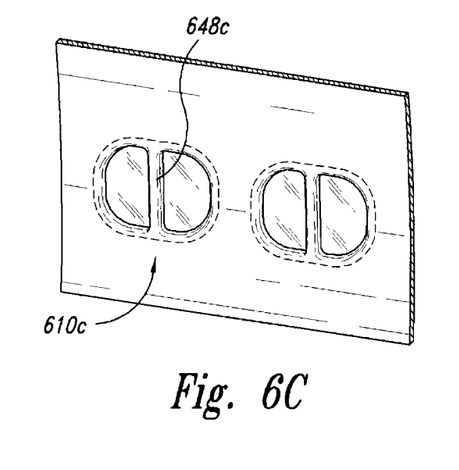
Figure 6D:
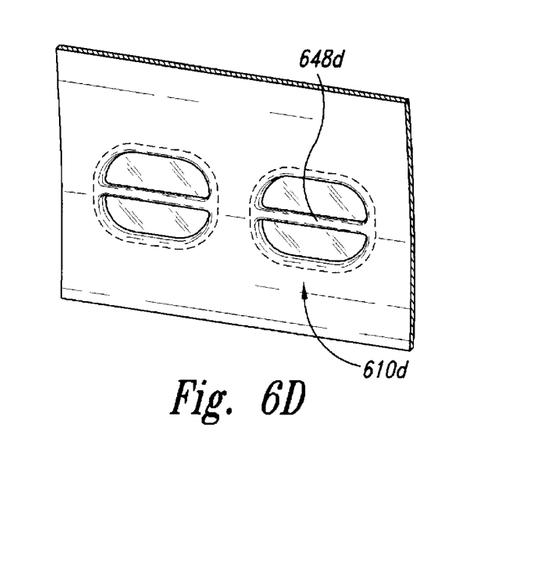
Figure 6E:
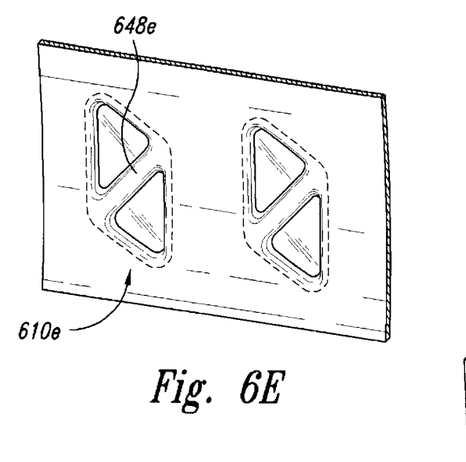
Figure 6F:
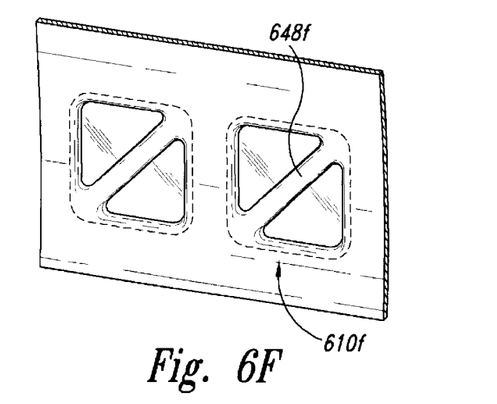

FIGS. 6B–6I illustrate windows having multiple pane assemblies in accordance with other embodiments of the invention. For example, FIG. 6B illustrates a window assembly 610b having cross members 648b positioned to form four apertures 647b, each supporting a pane assembly 630b that together define a rounded, square shape. FIG. 6C illustrates a window assembly 610c having a single vertical cross member 648c, and FIG. 6D illustrates a window assembly 610d having a generally horizontal cross member 648d. FIG. 6E illustrates a window assembly 610e having a diagonal cross member 648e that divides the viewing area into two generally triangular portions that together form a viewing area having a vertical extent greater than the horizontal extent. FIG. 6F illustrates a window assembly 610f having a diagonal cross member 648f that extends across a generally rectangular viewing area.

Figure 6G:
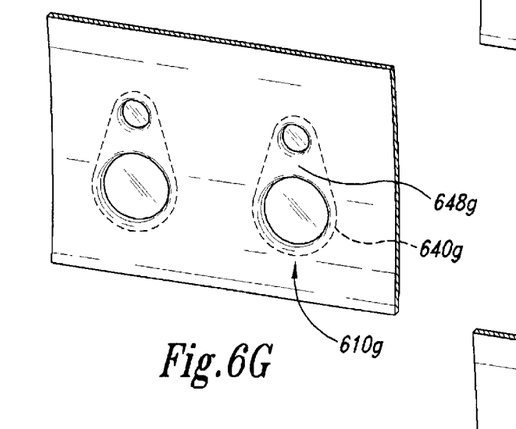

In other embodiments, the windows can have multiple pane assemblies with each pane assembly defining a generally circular viewing area. For example, as shown in FIG. 6G, a window assembly 610g in accordance with an embodiment of the invention can have a horizontal cross member 648g that separates circular viewing area portions having different diameters. In one embodiment, the two viewing area portions can be enclosed by a single frame 640g. In another embodiment (described below with reference to FIG. 6H), each circular viewing area can be enclosed by a separate frame.

Figure 6H:
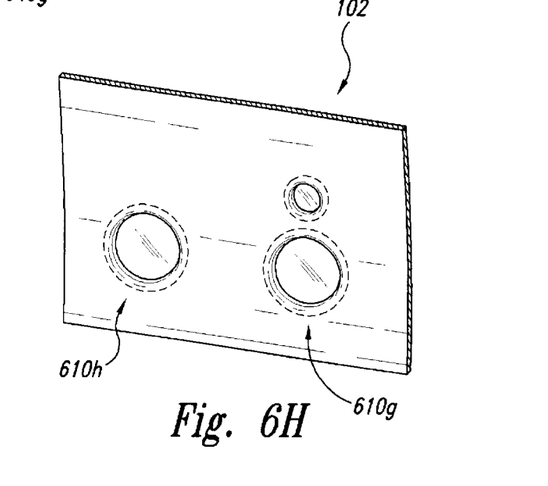
Figure 6I:
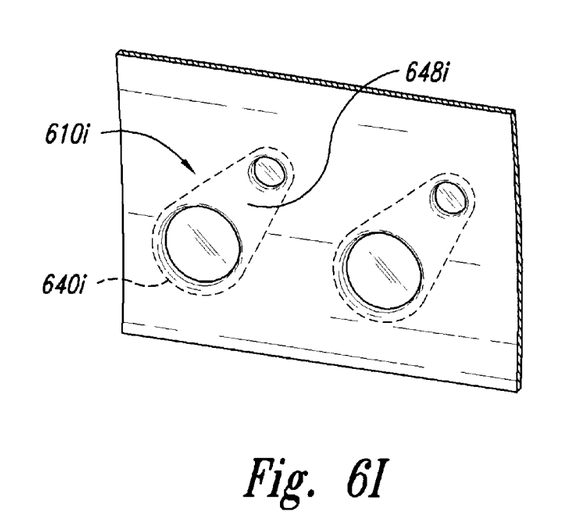

FIG. 6H illustrates a window assembly 610G (generally similar to that described above with reference to FIG. 6G but having an individual frame for each circular viewing area) positioned adjacent to a window assembly 610h having a single pane arrangement. As shown in FIG. 6I, a window assembly 610I in accordance with another aspect of the invention can have a generally diagonal cross member 648i that separates two circular viewing area portions, each having a different diameter. In a further aspect of this embodiment, a single frame 640I can surround both viewing area portions.

In any of the embodiments described above with reference to FIGS. 6A–6I, a single frame can support a plurality of pane assemblies separated by one or more cross members. Accordingly, the single frame can be completely contained within the area bounded by neighboring ribs 107 (FIG. 2) and neighboring stringers 106 (FIG. 2). In other embodiments, separate frames can be provided for each of the multiple pane assemblies, and one pane assembly can be positioned on one side of the rib 107 or stringer 106, and another pane assembly can be positioned on the other side of the rib 107 or stringer 106. An advantage of providing multiple pane assemblies within a single frame is that this arrangement can reduce the number of parts required for installing the window, and can position the separated portions of the viewing area closer to each other, which can improve visibility for the passengers.

Figure 7:
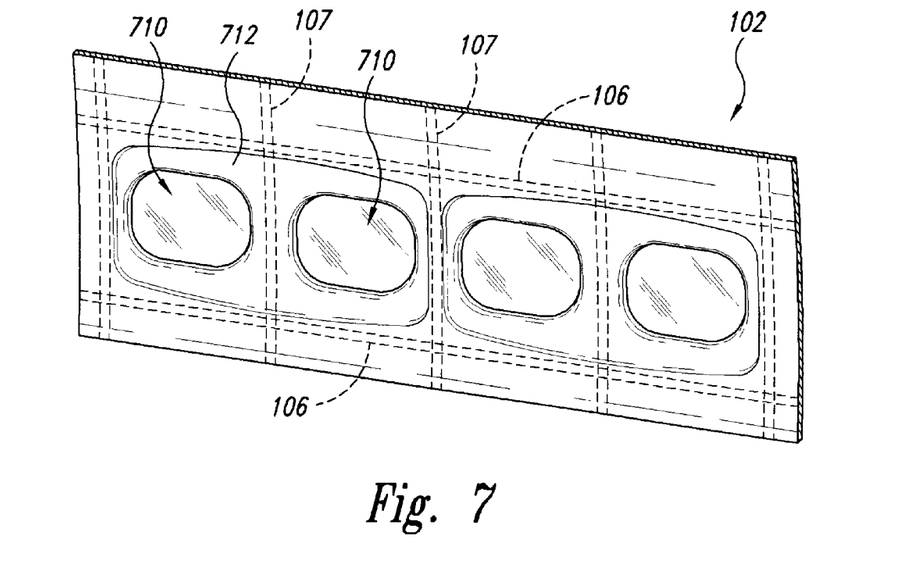
FIG. 7 illustrates neighboring windows sharing a single bezel in accordance with still another embodiment of the invention.

FIG. 7 is an isometric interior view of a portion of the fuselage 102 having window assemblies 710 in accordance with another embodiment of the invention. In one aspect of this embodiment, neighboring window assemblies 710 are separated by a rib 107. In another embodiment, neighboring window assemblies 710 can be separated by a stringer 106. In either of these embodiments, a single bezel 712 can be positioned around at least two neighboring window assemblies 710. In one embodiment, the window assemblies 710 can have a longitudinally elongated, rectangular shape, as shown in FIG. 7. In other embodiments, the window assemblies 710 can have other shapes, for example, any of the shapes described above with reference to FIGS. 1–6I. An advantage of any of these embodiments is that the number of parts required to install the window assemblies 710 can be reduced because, for example, one (rather than two) bezels 712 are required for each pair of window assemblies 710.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An aircraft window, comprising:

a unitary window frame configured for installation in a passenger cabin of an aircraft, the window frame having a first aperture extending through the window frame and a second aperture extending through the window frame;

an at least partially light transmissive first pane assembly carried by the window frame and positioned in the first aperture, the first pane assembly having a first face and a second face facing opposite from the first face, the first pane assembly being configured to withstand a pressure differential between the first and second faces of about 8.6 psi or more; and an at least partially light transmissive second pane assembly carried by the window frame and positioned in the second aperture, the second pane assembly having a first face and a second face facing opposite from the first face, the second pane assembly being configured to withstand a pressure differential between the first and second faces of about 8.6 psi or more.

2. The window of claim 1 wherein the aircraft has a longitudinal axis and a circumferential axis, and wherein the window frame includes a divider between the first and second apertures, the divider being configured to be generally aligned with the longitudinal axis.

3. The window of claim 1 wherein the aircraft has a longitudinal axis and a circumferential axis, and wherein the window frame includes a divider between the first and second apertures, the divider being configured to be generally aligned with the circumferential axis.

4. The window of claim 1 wherein the aircraft has a longitudinal axis and a circumferential axis, and wherein the window frame includes a divider between the first and second apertures, the divider being configured to be aligned with neither the longitudinal axis nor the circumferential axis.

5. The window of claim 1 wherein the window frame includes a divider between the first and second apertures, the window frame further including a surrounding portion disposed around the first and second apertures, and wherein the divider is integrally formed with the surrounding portion.

6. The window of claim 1 wherein the first pane assembly is configured to separate from the window frame independently of the second pane assembly in a decompression event.

7. The window of claim 1 wherein the window frame includes a third aperture and a fourth aperture, and wherein the window further comprises:

an at least partially light transmissive third pane assembly carried by the window frame and positioned in the third aperture, the third pane assembly having a first face and a second face facing opposite from the first face, the third pane assembly being configured to withstand a pressure differential between the first and second faces of about 8.6 psi or more; and an at least partially light transmissive fourth pane assembly carried by the window frame and positioned in the fourth aperture, the fourth pane assembly having a first face and a second face facing opposite from the first face, the fourth pane assembly being configured to withstand a pressure differential between the first and second faces of about 8.6 psi or more.

8. An aircraft, comprising:

a fuselage having a fuselage wall enclosing a flight deck portion and a passenger cabin portion, the fuselage wall having a composite structure that includes elongated generally parallel fibers and a matrix material;

a window frame carried by the fuselage at the passenger cabin portion, the window frame including a flange positioned adjacent to the fuselage wall, at least a portion of the flange being integrated with the elongated fibers, and wherein at least one side of the window frame is aligned at least approximately parallel with at least some of the elongated fibers; and an at least partially light transmissive pane assembly carried by the frame, the pane assembly having a first face and a second face facing opposite from the first face, the pane assembly being configured to withstand a pressure differential between the first and second faces of about 8.6 psi or more, each of the first and second faces having a contiguous unobstructed area of about 180 square inches or more.

9. The aircraft of claim 8 wherein the window frame includes a flange positioned adjacent to the fuselage wall, the window frame further including an aperture positioned inward of the flange, the pane assembly being received in the aperture.

10. The aircraft of claim 8 wherein the fuselage wall has a composite structure that includes elongated fibers and a matrix material, and wherein the window frame includes a flange positioned adjacent to the fuselage wall, at least a portion of the flange being integrated with the elongated strands.

11. An aircraft, comprising:

a fuselage having a plurality of circumferentially extending ribs including first and second neighboring ribs;

a fuselage wall carried by the plurality of ribs, the fuselage wall having a flight deck portion enclosing a flight deck of the aircraft and a passenger cabin portion enclosing a passenger cabin of the aircraft;

a passenger seat housed in the passenger cabin portion of the aircraft;

an at least partially light transmissive first pane assembly positioned between the first and second immediately neighboring ribs and having a first face and a second face facing opposite from the first face, the first pane assembly being configured to withstand a pressure differential between the first and second faces of about 8.6 psi or more, the first pane assembly being positioned adjacent to the passenger seat and being visually accessible from the passenger seat; and an at least partially light transmissive second pane assembly positioned between the first and second neighboring ribs and having a first face and a second face facing opposite from the first face, the second pane assembly being configured to withstand a pressure differential between the first and second faces of about 8.6 psi or more, the second pane assembly being positioned adjacent to the passenger seat and being visually accessible from the passenger seat.

12. The aircraft of claim 11, further comprising a window frame positioned between the first and second neighboring ribs and having a first aperture carrying the first pane assembly and a second aperture carrying the second pane assembly.

13. The aircraft of claim 11, further comprising:

a first window frame positioned between the first and second neighboring ribs and having a first aperture carrying the first pane assembly; and a second window frame positioned between the first and second neighboring ribs and having a second aperture carrying the second pane assembly.

14. The aircraft of claim 11, further comprising a plurality of longitudinally extending stringers including first and second neighboring stringers, wherein the first and second pane assemblies are positioned between the first and second neighboring stringers.

15. An aircraft, comprising:

a fuselage having a fuselage wall with a flight deck portion enclosing a flight deck of the aircraft and a passenger cabin portion enclosing a passenger cabin of the aircraft, the fuselage being elongated along a longitudinal axis and having a circumferential axis transverse to the longitudinal axis, the fuselage having a composite structure that includes elongated generally parallel fibers and a matrix material;

a window frame carried by the fuselage at the passenger cabin of the aircraft, at least one edge of the window frame being aligned with adjacent elongated fibers; and an at least partially light transmissive pane assembly carried by the window frame, the pane assembly having a first face and a second face facing opposite from the first face, the pane assembly being configured to withstand a pressure differential between the first and second faces of about 8.6 psi or more, the pane assembly having a viewing area within the frame.

16. The aircraft of claim 15 wherein the viewing area havs a generally triangular shape with first, second and third side portions.

17. The aircraft window of claim 15 wherein the viewing area havs a generally triangular shape with first, second and third side portions, and wherein the third side portion has an at least partially upright orientation, still further wherein the first and second side portions meet at a vertex region, the vertex region being positioned forward of the third side portion.

18. The aircraft window of claim 15 wherein the viewing area has a generally triangular shape with first, second and third side portions, and wherein the third side portion has an at least partially upright orientation, still further wherein the first and second side portions meet at a vertex region, the vertex region being positioned aft of the third side portion.

19. An aircraft, comprising:

a fuselage having a fuselage wall with a flight deck portion enclosing a flight deck of the aircraft and a passenger cabin portion enclosing a passenger cabin of the aircraft, the fuselage being elongated along a longitudinal axis and having a circumferential axis transverse to the longitudinal axis, wherein the fuselage wall has a composite structure that includes elongated generally parallel fibers and a matrix material;

a window frame carried by the fuselage at the passenger cabin of the aircraft, wherein at least one edge of the window frame is aligned with adjacent elongated fibers; and an at least partially light transmissive pane assembly carried by the frame, the pane assembly having a first face and a second face facing opposite from the first face, the pane assembly being configured to withstand a pressure differential between the first and second faces of about 8.6 psi or more, the pane assembly having a viewing area within the frame, the viewing area having a generally diamond shape with a major axis aligned with one of the circumferential axis and the longitudinal axis, and a minor axis aligned with the other of the circumferential axis and the longitudinal axis, the major axis being longer than the minor axis.

20. The aircraft of claim 19 wherein the major axis is aligned with the circumferential axis of the fuselage and the minor axis is aligned with the longitudinal axis of the fuselage.

21. The aircraft of claim 19 wherein the viewing area is bounded by four side regions and four corner regions and wherein the four corner regions are generally rounded.

22. The aircraft of claim 19 wherein the window frame includes a flange positioned adjacent to the fuselage wall, at least a portion of the flange being integrated with the elongated fibers.

23. An aircraft, comprising:
a fuselage having a fuselage wall with a flight deck portion enclosing a flight deck of the aircraft and a passenger cabin portion enclosing a passenger cabin of the aircraft;
a unitary window frame carried by the fuselage at the passenger cabin portion of the aircraft, the window frame having a first aperture and a second aperture;
an at least partially light transmissive first pane assembly carried by the window frame and positioned in the first aperture, the first pane assembly having a first face and a second face facing opposite from the first face, the first pane assembly being configured to withstand a pressure differential between the first and second faces of about 8.6 psi or more; and
an at least partially light transmissive second pane assembly carried by the window frame and positioned in the second aperture, the second pane assembly having a first face and a second face facing opposite from the first face, the second pane assembly being configured to withstand a pressure differential between the first and second faces of about 8.6 psi or more.

24. The aircraft of claim 23 wherein the fuselage wall has a composite structure that includes elongated fibers and a matrix material, and wherein the window frame includes a flange positioned adjacent to the fuselage wall, at least a portion of the flange being integrated with the elongated fibers.

25. The aircraft of claim 23 wherein the fuselage wall has a composite structure that includes elongated fibers and a matrix material.

26. The aircraft of claim 23 wherein the fuselage wall has a composite structure that includes elongated fibers and a matrix material, and wherein at least one edge of the window frame is aligned with adjacent elongated fibers.

27. The aircraft of claim 23 wherein at least one of the apertures has a generally circular shape.

28. The aircraft of claim 23 wherein at least one of the apertures has a generally triangular shape.

29. The aircraft of claim 23 wherein at least one of the apertures has a generally rectilinear shape.

30. The aircraft of claim 23 wherein at least one of the apertures has a generally triangular shape.

31. An aircraft, comprising:

a fuselage having a fuselage wall with a flight deck portion enclosing a flight deck of the aircraft and a passenger cabin portion enclosing a passenger cabin of the aircraft, the fuselage being elongated along a longitudinal axis and having a circumferential axis transverse to the longitudinal axis wherein the fuselage wall has a composite structure that includes elongated generally parallel fibers and a matrix material;

a window frame carried by the fuselage at the passenger cabin of the aircraft, wherein at least one edge of the window frame is aligned with adjacent elongated fibers; and an at least partially light transmissive pane assembly carried by the frame, the pane assembly having a first face and a second face facing opposite from the first face, the pane assembly being configured to withstand a pressure differential between the first and second faces of about 8.6 psi or more.

32. The aircraft of claim 31 wherein the window frame includes a flange positioned adjacent to the fuselage wall, at least a portion of the flange being integrated with the elongated fibers.

33. The aircraft of claim 31 wherein each of the first and second faces has a viewing area within the frame, the viewing area having a height generally aligned with the circumferential axis and a width generally aligned with the longitudinal axis, the width being greater than the height.

34. The aircraft of claim 31 wherein the panel assembly has a generally rectangular shape.

35. The aircraft of claim 31 wherein the panel assembly has a generally elliptical shape.

36. An aircraft, comprising:
a fuselage having a plurality of circumferentially extending ribs including first and second neighboring ribs spaced apart longitudinally by a spacing distance, the fuselage being elongated along a longitudinal axis and having a circumferential axis transverse to the longitudinal axis;

a fuselage wall carried by the plurality of ribs, the fuselage wall having a flight deck portion enclosing a flight deck of the aircraft and a passenger cabin portion enclosing a passenger cabin of the aircraft wherein the fuselage wall has a composite structure that includes elongated generally parallel fibers and a matrix material;

a window frame carried by the fuselage wall at the passenger cabin of the aircraft, wherein at least one edge of the window frame is aligned with adjacent elongated fibers; and an at least partially light transmissive pane assembly carried by the window frame, the pane assembly having a first face and a second face facing opposite from the first face, the pane assembly being configured to withstand a pressure differential between the first and second faces of about 8.6 psi or more, each of the first and second faces having an exposed area within the window frame, the exposed area having a height generally aligned with the circumferential axis and a width generally aligned with the longitudinal axis, the width being greater than 50% of the spacing distance.

37. The aircraft of claim 36 wherein the window frame includes a flange positioned adjacent to the fuselage wall, at least a portion of the flange being integrated with the elongated fibers.

38. The aircraft of claim 36 wherein the pane assembly has a generally rectangular shape with a major axis and a minor axis, and wherein the major axis is generally aligned with the longitudinal axis of the fuselage and the minor axis is generally aligned with the circumferential axis of the fuselage.

39. An aircraft, comprising:

a fuselage having a plurality of circumferentially extending ribs including a first rib, a second rib neighboring the first rib, and a third rib neighboring the second rib, with the second rib between the first and third ribs;

a fuselage wall carried by the plurality of ribs, the fuselage wall having a flight deck portion enclosing a flight deck of the aircraft and a passenger cabin portion enclosing a passenger cabin of the aircraft;

a first window frame carried by the fuselage wall at the passenger cabin portion of the aircraft, the first window frame being positioned between the first and second ribs;

a second window frame carried by the fuselage wall at the passenger cabin portion of the aircraft, the second window frame being positioned between the second and third ribs;

an at least partially light transmissive first pane assembly carried by the first window frame, the first pane assembly having a first face and a second face facing opposite from the first face, the first pane assembly being configured to withstand a pressure differential between the first and second faces of about 8.6 psi or more, each of the first and second faces having an exposed area within the window frame;

an at least partially light transmissive second pane assembly carried by the second window frame, the second pane assembly having a first face and a second face facing opposite from the first face, the second pane assembly being configured to withstand a pressure differential between the first and second faces of about 8.6 psi or more, each of the first and second faces having an exposed area within the window frame; and a window bezel positioned interior to the fuselage, the window bezel being disposed around and adjacent to both the first and second pane assemblies.

40. The aircraft of claim 39 wherein the fuselage wall has a composite structure that includes elongated fibers and a matrix material, and wherein at least one of the window frames includes a flange positioned adjacent to the fuselage wall, at least a portion of the flange being integrated with the elongated fibers.

41. The aircraft of claim 39 wherein the fuselage wall has a composite structure that includes elongated fibers and a matrix material.

42. The aircraft of claim 39 wherein the fuselage wall has a composite structure that includes elongated fibers and a matrix material, and wherein at least one edge of at least one of the window frames is aligned with adjacent elongated fibers.

43. The aircraft of claim 39 wherein at least one of the pane assemblies has a generally rectangular shape with a major axis and a minor axis, and wherein the major axis is generally aligned with the longitudinal axis of the fuselage and the minor axis is generally aligned with the circumferential axis of the fuselage.

44. A method for providing windows in an aircraft fuselage, comprising:

providing first and second immediately neighboring circumferentially extending ribs of an aircraft fuselage;

providing a fuselage wall having a first window aperture position and a second window aperture position;

attaching the fuselage wall to the ribs with the first and second window aperture positions located between the first and second ribs;

attaching a window frame to the fuselage wall, the window frame having a first aperture aligned with the first aperture position and a second aperture aligned with the second aperture position;

disposing an at least partially light transmissive first pane assembly in the first aperture; and disposing an at least partially light transmissive second pane assembly in the second aperture.

45. The method of claim 44, further comprising:

mounting the window frame to the fuselage with the first aperture aligned with the first window aperture position and the second aperture aligned with the second window aperture position; and after mounting the window frame, removing material from the fuselage wall in a region aligned with the first and second apertures.

46. The method of claim 44, further comprising:

removing material from the fuselage wall at the first aperture position to form a first opening;

removing material from the fuselage wall at the second aperture position to form a second opening;

mounting the window frame to the fuselage with the first aperture aligned with the first opening and the second aperture aligned with the second opening.

47. The method of claim 44 wherein the fuselage wall has a composite construction and wherein attaching the window frame to the fuselage wall includes integrating at least a portion of the window frame with elongated fibers that define at least in part the fuselage wall.

* * * * *